United States Patent
Baur et al.

(10) Patent No.: US 7,309,389 B2
(45) Date of Patent: Dec. 18, 2007

(54) PREPARATION OF AZO COLORANTS IN MICROREACTORS AND THEIR USE IN ELECTROPHOTOGRAPHIC TONERS AND DEVELOPERS, POWDER COATINGS, INK JET INKS AND ELECTRONIC MEDIAS

(75) Inventors: Ruediger Baur, Eppstein-Niederjosbach (DE); Hans-Tobias Macholdt, Darmstadt-Eberstadt (DE); Uwe Nickel, Bad Homburg (DE); Leonhard Unverdorben, Nidderau (DE); Christian Wille, Weinheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 11/450,228

(22) Filed: Jun. 9, 2006

(65) Prior Publication Data

US 2006/0228640 A1    Oct. 12, 2006

Related U.S. Application Data (60) Division of application No. 10/238,365, filed on Sep. 10, 2002, now Pat. No. 7,135,266, which is a continuation-in-part of application No. 09/780,218, filed on Feb. 9, 2001, now Pat. No. 6,469,147.

(30) Foreign Application Priority Data

Feb. 9, 2000 (DE) .................... 100 05 550
Aug. 16, 2000 (DE) .................... 100 40 100

(51) Int. Cl.
C09D 11/00 (2006.01)

(52) U.S. Cl. ............... 106/31.48; 106/31.5; 106/31.51; 106/31.52; 106/31.6; 106/31.77; 106/31.78; 106/31.8; 106/31.81

(58) Field of Classification Search ............ 106/31.48, 106/31.5, 31.51, 31.52, 31.6, 31.77, 31.78, 106/31.8, 31.81
See application file for complete search history.

(56) References Cited

U.S. PATENT DOCUMENTS

| 4,268,437 A | 5/1981 | Behringer et al. |
| 4,920,206 A | 4/1990 | Behringer et al. |
| 5,534,328 A | 7/1996 | Ashmead et al. |
| 5,560,760 A | 10/1996 | Toeppen |
| 5,811,062 A | 9/1998 | Wegeng et al. |
| 6,117,606 A | 9/2000 | Macholdt et al. |
| 6,168,895 B1 | 1/2001 | Metz et al. |
| 6,437,104 B1 | 8/2002 | Nickel et al. |
| 6,469,147 B2 | 10/2002 | Nickel et al. |
| 6,537,364 B2 | 3/2003 | Dietz et al. |
| 6,548,647 B2 | 4/2003 | Dietz et al. |
| 6,562,121 B2 | 5/2003 | Nickel et al. |
| 6,566,519 B2 | 5/2003 | Nickel et al. |
| 6,582,508 B2 | 6/2003 | Dietz et al. |
| 6,723,138 B2 | 4/2004 | Nickel et al. |
| 6,835,242 B2 | 12/2004 | Nickel et al. |
| 2002/0040662 A1 | 4/2002 | Dietz et al. |
| 2002/0098435 A1 | 7/2002 | Rohr et al. |
| 2003/0069420 A1 | 4/2003 | Koch et al. |
| 2003/0100792 A1 | 5/2003 | Koch et al. |

FOREIGN PATENT DOCUMENTS

| DE | 1544453 | 4/1970 |
| DE | 246257 | 6/1987 |
| DE | 3926466 | 2/1991 |
| EP | 0006190 | 1/1980 |
| EP | 0244686 | 11/1987 |
| EP | 0870541 | 10/1998 |
| GB | 1066769 | 4/1967 |

OTHER PUBLICATIONS

PCT Search Report for PCT/EP 01/01137, Jun. 1, 2001.
German Search Report for DE 100 05550.8, Jul. 6, 2001.
U.S. Appl. No. 10/544,076, by Nickel et al., filed Jul. 29, 2005.
U.S. Appl. No. 11/578,743 by Hoellein et al., filed Oct. 17, 2006.

Primary Examiner—Fiona T Powers
(74) Attorney, Agent, or Firm—Anthony A. Bisulca (57) ABSTRACT

The invention is directed to an electrophotographic toner or developer, powder coating, ink jet ink or an electronic media having an azo colorant prepared by conducting the diazotization of aromatic or hetaromatic amines or the azo coupling reaction or the diazotization and the azo coupling reaction in a microreactor.

10 Claims, 2 Drawing Sheets

PREPARATION OF AZO COLORANTS IN MICROREACTORS AND THEIR USE IN ELECTROPHOTOGRAPHIC TONERS AND DEVELOPERS, POWDER COATINGS, INK JET INKS AND ELECTRONIC MEDIAS

CROSS REFERENCE TO RELATED APPLICATIONS

This application is a divisional application of U.S. Ser. No. 10/238,365, filed Sep. 10, 2002, now U.S. Pat. No. 7,135,266, which is a continuation in part of U.S. Ser. No. 09/780,218, filed Feb. 9, 2001, now U.S. Pat. No. 6,469,147, the entire disclosure of which is incorporated herein by reference.

BACKGROUND OF THE INVENTION

The present invention relates to the field of azo colorants. Azo colorants are customarily produced in industry in batch operations in reaction vessels by mixing the starting materials together in aqueous phase (Fisher, Organische Chemie, Verlag Chemie, Weinheim/Bergstraβe, 1965, p. 890 ff., 1431, 1796 ff.).

Another way is the continuous mixing of equivalent amounts of the starting materials in the form of aqueous acidic or aqueous alkaline solutions in, for example, mixing nozzles and continuous flow reactors with or without a postreaction phase in a reaction vessel (azo coupling: DE 1 544 453, EP 244 686; diazotization: EP-A-0 006 190).

The principal process operations involved are the diazotization of aromatic or hetaromatic amines and the azo coupling reaction. Certain azo pigments may subsequently require a metal exchange reaction (laking) and/or an aftertreatment in water/solvents to obtain the desired crystal properties. In the case of some azo dyes, a reaction is subsequently carried out to form metal complexes.

In all these processes, it is essential that the process parameters, such as temperature, time and (in the case of azo pigments) also in particular the degree of mixing, be controlled, if the products are to be pure and of high and consistent quality. One problem with these processes is the scaleup of new products from the laboratory scale to the large industrial scale.

It is an object of the present invention to provide a process for preparing azo colorants that provides optimal control of the process parameters, ensures improved mixing of the reactants and simplifies scaleup.

It is a further object of the present invention to provide azo colorants having improved coloristic properties for use in electrophotographic toners and developers, powder coatings, ink jet inks and electronic medias.

DD 246 257 A1 discloses the possibility of using miniaturized apparatuses for chemical reactions where the chemical entities to be treated are only available in small quantities or are very costly, so that large dead spaces in the equipment become unaffordable. DE 3 926 466 C2 describes strong exothermic chemical reactions of two chemical entities in a microreactor.

Microreactors for chemical reactions are constructed from stacks of grooved plates and are described in DE 39 26 466 C2 and U.S. Pat. No. 5,534,328. It is pointed out in U.S. Pat. No. 5,811,062 that microchannel reactors are preferably used for reactions that do not require or produce materials or solids that would clog the microchannels.

SUMMARY OF THE INVENTION

It has now been found that, surprisingly, microreactors are useful for carrying out diazotization and azo coupling and also metal exchange reactions or metal complexing reactions to prepare azo colorants, such as azo pigments and azo dyes.

DESCRIPTON OF THE DRAWINGS

The invention will become more fully understood by reference to the following detailed description of the invention and the appended drawings in which.

DESCRIPTION OF THE PREFERRED EMBODIMENTS

As used herein, microreactor comprehends micro- and minireactors, which differ only by reason of the dimensions and construction of the reaction channel structures.

It is possible to use, for example, microreactors as known from the cited references or from publications of the Institut für Mikrotechnik Mainz GmbH, Germany, or else commercially available microreactors, for example Selecto™ (based on Cytos™) from Cellular Process Chemistry GmbH, Frankfurt/Main.

The invention accordingly provides a process for preparing azo colorants by conducting the diazotization of aromatic or hetaromatic amines or the azo coupling reaction or the metal exchange reactions or the metal complexing reactions or the diazotization and the azo coupling reaction and the metal exchange or metal complexing reactions in a microreactor.

Advantageously, the preferably aqueous solutions or suspensions of the starting materials are fed to the microreactor continuously and preferably in equivalent amounts. The classic process assistants such as resins, surfactants and other additives may likewise be used in the process of the invention.

The starting materials for the diazotization reaction are aromatic or hetaromatic amines or their ammonium salts, for example aniline, 2-nitroaniline, methyl anthranilate, 2,5-dichloroaniline, 2-methyl-4-chloroaniline, 2-chloroaniline, 2-trifluoromethyl-4-chloroaniline, 2,4,5-trichloroaniline; 3-amino-4-methylbenzamide, 2-methyl-5-chloroaniline, 4-amino-3-chloro-N'-methylbenzamide, o-toluidine, o-dianisidine, 2,2',5,5'-tetrachlorobenzidine, 2-amino-5-methylbenzenesulfonic acid, 2-amino-4-chloro-5-methylbenzenesulfonic acid.

Of particular interest for azo pigments are the following amine components:
4-methyl-2-nitrophenylamine, 4-chloro-2-nitrophenylamine, 3,3'-dichlorobiphenyl-4,4'-diamine, 3,3'-dimethylbiphenyl-4,4'-diamine, 4-methoxy-2-nitrophenylamine, 2-methoxy-4-nitrophenylamine, 4-amino-2,5-dimethoxy-N-phenylbenzenesulfonamide, dimethyl 5-aminoisophthalate, anthranilic acid, 2-trifluoromethylphenylamine, dimethyl 2-aminoterephthalate, 1,2-bis(2-aminophenoxy) ethane, diisopropyl 2-aminoterephthalate, 2-amino-4-chloro-5-methylbenzenesulfonic acid, 2-methoxyphenylamine, 4-(4-aminobenzoylamino)benzamide, 2,4-dinitrophenyl-amine, 3-amino-4-methylbenzamide, 3-amino-4-chlorobenzamide, 3-amino-4-chlorobenzoic acid, 4-nitrophenylamine, 2,5-dichlorophenylamine, 4-methyl-2-nitrophenylamine, 2-chloro-4-nitropheny- lamine, 2-methyl-5-nitrophenylamine, 2-methyl-4-nitrophenylamine, 2-methyl-5-nitrophenylamine, 2-amino-4-chloro-5-methylbenzenesulfonic acid, 2-aminonaphthalene-1-sulfonic acid, 2-amino-5-chloro-4-methylbenzenesulfonic acid, 2-amino-5-chloro-4-methylbenzenesulfonic acid, 2-amino-5-methylbenzenesulfonic acid, 2,4,5-trichlorophenylamine, 3-amino-4-methoxy-N-phenylbenzamide, 4-aminobenzamide, methyl 2-aminobenzoate, 4-amino-5-methoxy-2,N-dimethylbenzenesulfonamide, monomethyl 2-amino-N-(2,5-dichlorophenyl)terephthalate, butyl 2-aminobenzoate, 2-chloro-5-trifluoromethylphenylamine, 4-(3-amino-4-methylbenzoylamino)benzenesulfonic acid, 4-amino-2,5-dichloro-N-methylbenzenesulfonamide, 4-amino-2,5-dichloro-N,N-dimethyl-benzenesulfonamide, 6-amino-1H-quinazolin-2,4-dione, 4-(3-amino-4-methoxy-benzoylamino)benzamide, 4-amino-2,5-dimethoxy-N-methylbenzenesulfonamide, 5-aminobenzimidazolone, 6-amino-7-methoxy-1,4-dihydroquinoxalin-2,3-dione, 2-chloroethyl 3-amino-4-methylbenzoate, isopropyl 3-amino-4-chlorobenzoate, 3-amino-4-chlorobenzotrifluoride, n-propyl 3-amino-4-methylbenzoate, 2-aminonaphthalene-3,6,8-trisulfonic acid, 2-aminonaphthalene-4,6,8-trisulfonic acid, 2-aminonaphthalene-4,8-disulfonic acid, 2-aminonaphthalene-6,8-disulfonic acid, 2-amino-8-hydroxynaphthalene-6-sulfonic acid, 1-amino-8-hydroxy-naphthalene-3,6-disulfonic acid, 1-amino-2-hydroxybenzene-5-sulfonic acid, 1-amino-4-acetylaminobenzene-2-sulfonic acid, 2-aminoanisole, 2-aminomethoxybenzene-ω-methanesulfonic acid, 2-aminophenol-4-sulfonic acid, o-anisidine-5-sulfonic acid, 2-(3-amino-1,4-dimethoxybenzenesulfonyl)ethyl sulfate and 2-(1-methyl-3-amino-4-methoxybenzenesulfonyl)ethyl sulfate.

The following amine components are of particular interest for azo dyes:
2-(4-aminobenzenesulfonyl)ethyl sulfate, 2-(4-amino-5-methoxy-2-methylbenzene-sulfonyl)ethyl sulfate, 2-(4-amino-2,5-dimethoxybenzenesulfonyl)ethyl sulfate, 2-[4-(5-hydroxy-3-methylpyrazol-1-yl)benzenesulfonyl]ethyl sulfate, 2-(3-amino-4-methoxybenzenesulfonyl)ethyl sulfate, 2-(3-aminobenzenesulfonyl)ethyl sulfate. The amine to be diazotized, or its ammonium salt, preferably its hydrochloride or sulfate, is preferably dissolved or suspended in water and/or an organic solvent and the resulting solution or suspension is continuously introduced into the microreactor (reactant stream A).

Concurrently, a solution or suspension, preferably an aqueous solution or suspension, of a diazotizing agent, preferably $NaNO_2$ or nitrosylsulfuric acid, is continuously introduced into the microreactor (reactant stream B). In the reactor, reactant streams A and B are continuously mixed with each other and reacted.

The starting materials for azo coupling reactions are diazonium salts, for example as above-mentioned or -prepared, and coupling components in solution or suspension.

The following coupling components are of particular interest for azo pigments:
acetoacetarylides

-continued

2-hydroxynaphthalenes where X═H, COOH, and $R_k$═$CH_3$, $OCH_3$, $OC_2H_5$, $NO_2$, Cl, $NHCOCH_3$ and n═0 to 3; and
also $R_2$═H, $CH_3$ and $C_2H_5$,
bisacetoacetylated diaminobenzenes and -biphenyls, N,N'-bis(3-hydroxy-2-naphthoyl)phenylenediamines (each optionally substituted), and also pyrazolones where R═$CH_3$, $COOCH_3$, $COOC_2H_5$,
R'═$CH_3$, $SO_3H$, Cl;
p═0 to 3.

The following coupling components are of particular interest for azo dyes:
4-[5-hydroxy-3-methylpyrazol-1-yl]benzenesulfonic acid, 2-aminonaphthalene-1,5-disulfonic acid, 5-methoxy-2- methyl-4-[3-oxobutyrylamino]benzenesulfonic acid, 2-methoxy-5-methyl-4-[3-oxobutyrylamino]benzenesulfonic acid, 4-acetylamino-2-aminobenzenesulfonic acid, 4-[4-chloro-6-(3-sulfophenylamino)-[1,3,5]-triazin-2-yl-amino]-5-hydroxynaphthalene-2,7-disulfonic acid, 4-acetylamino-5-hydroxynaphthalene-2,7-disulfonic acid, 4-amino-5-hydroxynaphthalene-2,7-disulfonic acid, 5-hydroxy-1-[4-sulfophenyl]-1H-pyrazole-3-carboxylic acid, 2-aminonaphthalene-6,8-disulfonic acid, 2-amino-8-hydroxynaphthalene-6-sulfonic acid, 1-amino-8-hydroxynaphthalene-3,6-disulfonic acid, 2-aminoanisole, 2-aminomethoxybenzene-ω-methanesulfonic acid and 1,3,5-trishydroxybenzene.

The azo coupling is preferably carried out in aqueous solution, but it is also possible to use organic solvents, if appropriate mixed with water, for example aromatic hydrocarbons, hydrochlorocarbons, glycol ethers, nitrites, esters, dimethylformamide, tetramethylurea and N-methylpyrrolidone.

To carry out the azo coupling reaction according to the invention, a solution or suspension of the diazonium salt (reactant stream C) and a solution or suspension of the coupling component (reactant stream D) are continuously introduced into the microreactor and continuously mixed with each other therein and reacted.

The starting materials for laking are azo colorants that contain acid groups, in the form of the free acids or their, for example, alkali metal salts or salts of alkaline earth metals, ammonium salts or aluminum or manganese salts.

To lake azo pigments, a metal salt solution, for example an aqueous calcium, strontium bromine or manganese salt solution (reactant stream E), is mixed with the solution or suspension of an azo colorant that contains acid groups (reactant stream F), and brought to a temperature between 30 and 100° C., in the microreactor. The laking reaction takes place in the reactor itself or is initiated there. The reaction may be completed in a downstream continuous tubular reactor (delay vessel).

For the purposes of the present invention, not only the diazotization, the azo coupling reaction but also the laking reaction or the metal complexing reaction may each be carried out in (successive) microreactors, or the diazotization is carried out in a conventional manner and only the azo coupling reaction is carried out in the microreactor, or the diazotization is carried in the microreactor and the azo coupling is carried out in a conventional manner. Similarly, the laking may in each case be carried out conventionally or else in a microreactor. It is also possible to use microreactors having two or more reaction zones for the individual reaction steps.

A microreactor is constructed from a plurality of laminae which are stacked and bonded together and whose surfaces bear micromechanically created structures which interact to form reaction spaces for chemical reactions. The system contains at least one continuous channel connected to the inlet and the outlet.

The flow rates of the material streams are limited by the apparatus, for example by the pressures which result depending on the geometry of the microreactor. It is desirable for the reaction to take place completely in the microreactor, but it is also possible to adjoin a delay zone to create a delay time that may be required.

The flow rates are advantageously between 0.05 and 5 l/min, preferably between 0.05 and 500 ml/min, particularly preferably between 0.05 and 250 ml/min, especially between 0.1 and 100 ml/min.

Figure 1:
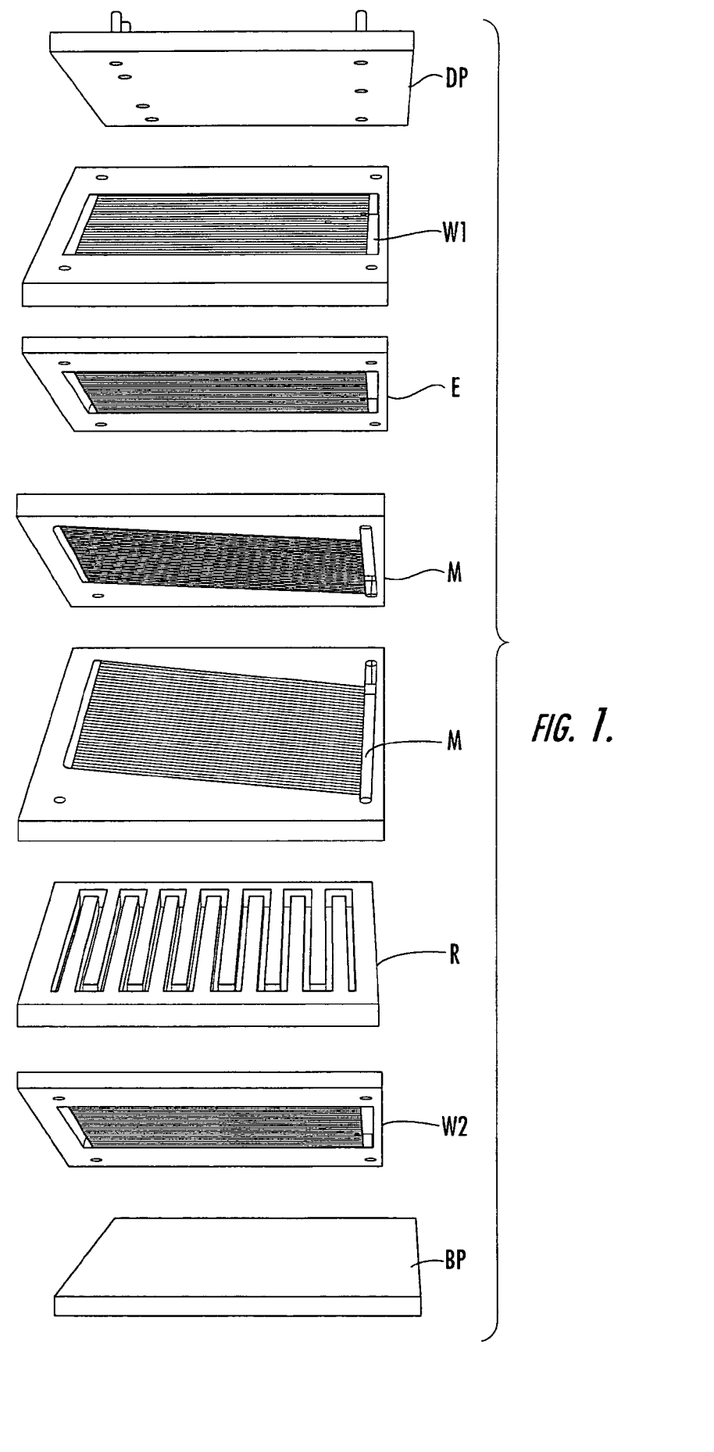
FIG. 1 is a perspective view of the compact parts that form the microreactor.

A microreactor useful for preparing azo colorants is described in FIG. 1 by way of example.

The present microreaction system is constructed from six microstructured metal laminae, stacked and bonded together, plus a lid plate (LP) and a base plate (BP) to form a processing module that is firmly held or bonded together to compress sealing sheets between the plates.

The present microreaction system includes two heat exchangers for cooling and/or heating medium, a mixing zone for mixing the reactants and a short delay zone.

The heat exchanger (W1) preheats the reactant streams flowing separately into plate (E). The reactant streams are then mixed within plates (M), which form a conjoint space. The delay zone (R) brings the reaction mixture to the desired reaction temperature with the aid of the heat exchanger (W2), so that the desired chemical reaction can take place.

The microreaction system is operated continuously, and the fluid quantities which are mixed with each other in each case are in the microliter (μl) to milliliter (ml) region.

The dimensions of the microstructured regions within the reactor are decisive for preparing azo colorants in this microreaction system. These dimensions have to be sufficiently large that, in particular, solid particles can pass through without problem and so do not clog up the channels. The smallest clear width of the microstructures should be about ten times larger than the diameter of the largest pigment particles. Furthermore, it has to be ensured, by appropriate geometric styling, that there are no dead water zones, for example dead ends or sharp corners, where for example pigment particles could sediment. Preference is therefore given to continuous paths having round corners. The structures have to be sufficiently small to exploit the intrinsic advantages of microreaction technology, namely excellent heat control, laminar flow, diffuse mixing and low internal volume.

The clear width of the solution- or suspension-ducting channels is advantageously 5 to 10 000 μm, preferably 5 to 2 000 μm, particularly preferably 10 to 800 μm, especially 20 to 700 ρm.

The clear width of the heat exchanger channels depends primarily on the clear width of the liquid- or suspension-ducting channels and is advantageously not more than 10 000 μm, preferably not more than 2 000 μm, especially not more than 800 μm. The lower limit of the clear width of the heat exchanger channels is uncritical and is at most constrained by the pressure increase of the heat exchanger fluid to be pumped and by the necessity for optimum heat supply or removal.

Figure 2:
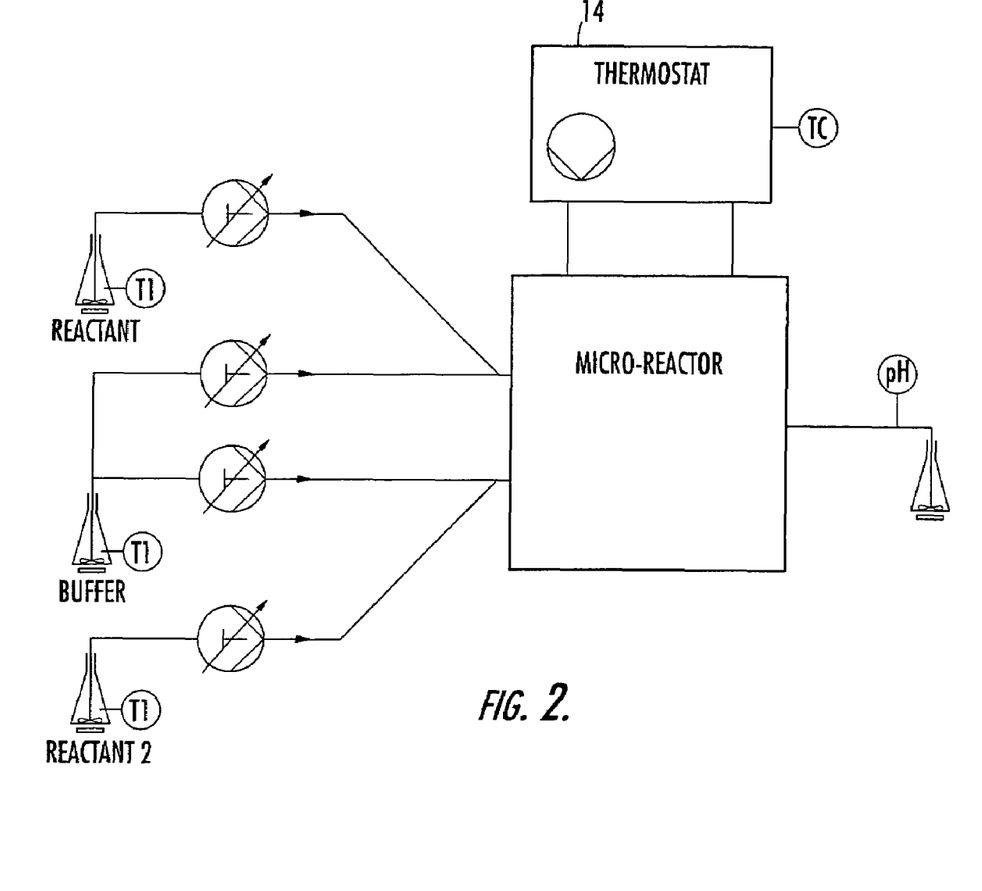
FIG. 2 is a schematic of the apparatus used in the process.

The dimensions of the microreaction system used are:
Heat exchanger structures: channel width ~600 μm channel height ~250 μm
Mixer and delay time: channel width ~600 μm channel height ~500 μm The six superposed and closely conjoined metal laminae are preferably supplied with all heat exchanger fluids and reactants from above. The product and the heat exchanger fluids are preferably likewise removed upwardly. The possible supply of third and fourth liquids involved in the reaction (eg. buffer solutions) is realized via a T-junction located directly upstream of the reactor (FIG. 2), ie. one reactant can be premixed with the buffer solution. The requisite concentrations and flows are preferably controlled via precision piston pumps and a computer-controlled control system. The reaction temperature is monitored via integrated sensors and monitored and controlled with the aid of the control system and of a thermostat/cryostat.

The preparation of mixtures of feedstocks to form material streams may also be carried out in advance in micromixers or in upstream mixing zones. It is also possible for feedstocks to be metered into downstream mixing zones or into downstream micromixers or -reactors.

The system used here is made of stainless steel; other materials, for example glass, ceramic, silicon, plastics or other metals, may also be used.

Diazotizations are carried out at temperatures of −10 to +80° C., preferably −5 to +30° C., and azo couplings at 0 to 90° C., preferably at 10 to 60° C.

For both the diazotization and the azo coupling, the reactant streams may be admixed with buffer solutions, preferably of organic acids and salts thereof, for example acetic acid/acetate buffer, citric acid/citrate buffer, or of inorganic acids and salts thereof, for example phosphoric acid/phosphate or carbonic acid/carbonate.

The process of the invention provides high reaction rates with significantly higher reaction temperatures than, for example, in the batch process. More particularly, temperature-sensitive reactants, for example diazonium salts and alkaline solutions of 2-hydroxy-3-naphtharylides, can be reacted with advantage. The high heat transfer rate during the short residence time in the micro- or minireactor makes it possible to realize a short thermal stress of the reactant within a narrowly definable time window.

The process of the invention provides azo colorants, such as azo pigments and azo dyes.

Azo pigments may be monoazo or disazo (laked and unlaked) pigments. It is also possible to prepare mixtures of azo pigments. Contemplated azo pigments are in particular C.I. Pigment Yellow 1, 3, 12, 13, 14, 16, 17, 65, 73, 74, 75, 81, 83, 97, 111, 120, 126, 127, 151, 154, 155, 174, 175, 176, 180, 181, 183, 191, 194, 198; Pigment Orange 5, 34, 36, 38, 62, 72, 74; Pigment Red 2, 3, 4, 8, 12, 14, 22, 48:1-4, 49:1, 52:1-2, 53:1-3, 57:1, 60:1, 112, 137, 144, 146, 147, 170, 171, 175, 176, 184, 185, 187, 188, 208, 214, 242, 247, 253, 256, 266; Pigment Violet 32; Pigment Brown 25.

With regard to dyes, disperse dyes are contemplated as well as water-soluble anionic and cationic dyes. Contemplated dyes are in particular mono-, dis- or polyazo dyes and also formazan or anthraquinone dyes. Water-soluble dyes are in particular the alkali metal salts or ammonium salts of reactive dyes and also of acidic wool dyes or direct cotton dyes of the azo series. Contemplated azo dyes are preferably metal-free and metallizable monoazo, disazo and trisazo dyes containing one or more sulfonic acid or carboxylic acid groups, heavy metal-containing, namely copper-, chromium or cobalt-containing monoazo, disazo and trisazo dyes. The intermediates for the metal-containing dyes may be prepared by the customary method in a conventional batch process. The subsequent metal complexing reaction, for example with copper ions, is then preferably carried out at temperatures between 30 and 100° C. in a micro reactor.

Contemplated reactive azo dyes are in particular C.I. Reactive Yellow 15, 17, 37, 57, 160; Reactive Orange 107; Reactive Red 2, 23, 35, 180; Reactive Violet 5; Reactive Blue 19, 28, 203, 220; and Reactive Black 5, 8, 31.

This process also provides in particular C.I. Acid Yellow 17, 23; Direct Yellow 17, 86, 98, 132, 157; and Direct Black 62, 168 and 171.

It is surprising and was unforeseeable that the production of azo colorants is possible in this technically elegant way, since it was hitherto assumed that the production of solids in the microreactor would cause the system to clog up.

The azo pigments prepared according to the invention are useful for pigmenting macromolecular organic materials of natural or synthetic origin, for example plastics, resins, coatings, paints or electrophotographic toners and developers and also inks, including printing inks.

The azo dyes prepared according to the invention are useful for dyeing or printing hydroxyl-containing or nitrogenous natural organic and also synthetic substrates. Such substrates include for example synthetic or natural fiber materials and also leather materials comprising predominantly natural or regenerated cellulose or natural or synthetic polyamides. They are particularly useful for dyeing and printing textile material based on acetate, polyester, polyamide, polyacrylonitrile, PVC and polyurethane fibers and also wool or in particular cotton. To this end, the dyes can be applied to the textile materials by the usual exhaust, padding or printing processes.

The azo colorants prepared according to the invention are useful as colorants in electrophotographic toners and developers, for example one- or two-component powder toners (also known as one- or two-component developers), magnet toners, liquid toners, latex toners, polymerization toners and also specialty toners, such as microencapsulated toners, based for example on wax, CD/DVD-dyes.

Typical toner binders are addition polymerization, polyaddition and polycondensation resins, such as styrene, styrene-acrylate, styrene-butadiene, acrylate, polyester, phenol-epoxide resins, polysulfones, polyurethanes, individually or in combination, and also polyethylene and polypropylene, which may each include further ingredients, such as charge control agents, waxes or flow assistants, or are subsequently modified with these additives.

In order to obtain electrophotographic toners or developers having either a positive or a negative charge, it is common to add charge control agents. As the coloring component in color toners, use is typically made of organic color pigments. As compared with dyes, color pigments have considerable advantages on account of their insolubility in the application medium, such as improved thermal stability and lightfastness, for example.

On the basis of the principle of subtractive color mixing it is possible, with the aid of the three primary colors yellow, cyan and magenta, to reproduce the entire spectrum of colors visible to the human eye. Exact color reproduction is possible only if the particular primary color satisfies the precisely defined coloristic requirements. If it is not the case, some shades cannot be reproduced, and the color contrast is inadequate.

In the case of full color toners, the three toners yellow, cyan and magenta must not only meet the precisely defined color requirements but must also be matched exactly to one another in terms of their triboelectric properties, since they are transferred one after the other in the same device.

6- and 7-color systems are likewise known. The base colors are red, green, blue, cyan, magenta, yellow, and black. It is also possible to produce full color prints by the Pantone Hexachrome® system with the colors cyan, magenta, yellow, black, orange and green.

It is known that colorants may have a long-term effect on the triboelectric charging of toners. As a result, it is normally not possible simply to add the colorants to a toner base formulation once prepared. It may instead be necessary to prepare a specific formulation for each colorant, with the nature and amount of the required charge control agent being tailored specifically. This approach is, correspondingly, laborious and in the case of color toners for process color is just another difficulty to add to those already described above.

Furthermore, it is important for practical use that the colorants possess high thermal stability and good dispersibility. Typical temperatures for incorporation of colorants into the toner resins are between 100° C. and 200° C. when using compounders or extruders. Accordingly, a thermal stability of 200° C., or better still 250° C., is of great advantage. It is also important that the thermal stability is maintained over a prolonged period (about 30 minutes) and in different binder systems.

Besides the physical effect of the toner constituents with respect to coloristics and electrostatics, and an optimum dispersibility of the components, the quality of the toners is critically influenced by the preparation process of the colorant. Of major importance are colorants, especially pigments, having high color strength and high transparency.

The azo colorants prepared according to the invention are further useful as colorants in powders and powder coatings, especially in triboelectrically or electrokinetically sprayable powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) include for example acid anhydride, imidazoles and also dicyandiamide and derivatives thereof, capped isocyanates, bisacylurethanes, phenolic and melamine resins, triglycidyl isocyanurates, oxazolines and dicarboxylic acids.

The azo colorants prepared according to the invention are also useful as colorants in inks, preferably inkjet inks, for example on an aqueous or nonaqueous basis, microemulsion inks and also in such inks as operate according to the hot-melt principle.

Inkjet inks generally include a total of 0.5 to 15% by weight, preferably 1.5 to 8% by weight, (reckoned dry) of one or more of the compounds according to the invention. Microemulsion inks are based on organic solvents and water with or without an additional hydrotropic substance (interface mediator). Microemulsion inks include 0.5 to 15% by weight, preferably 1.5 to 8% by weight, of one or more of the compounds according to the invention, 5 to 99% by weight of water and 0.5 to 94.5% by weight of organic solvent and/or hydrotropic compound.

Solvent based inkjet inks preferably include 0.5 to 15% by weight of one or more compounds according to the invention, 85 to 99.5% by weight of organic solvent and/or hydrotropic compounds.

Hot-melt inks are based mostly on waxes, fatty acids, fatty alcohols or sulfonamides that are solid at room temperature and liquefy on heating, the preferred melting range lying between about 60° C. and about 140° C. Hot-melt inkjet inks consist essentially for example of 20 to 90% by weight of wax and 1 to 10% by weight of one or more of the compounds according to the invention. They may further include 0 to 20% by weight of an additional polymer (as "dye solvent"), 0 to 5% by weight of dispersant, 0 to 20% by weight of viscosity modifier, 0 to 20% by weight of plasticizer, 0 to 10% by weight of tack additive, 0 to 10% by weight of transparency stabilizer (prevents crystallization of waxes, for example) and also 0 to 2% by weight of antioxidant. Typical additives and assistants are described for example in U.S. Pat. No. 5,560,760.

The azo colorants prepared according to the invention are also useful as colorants for color filters and also for additive as well as subtractive color generation and as colorants in electronic papers.

The present invention provides for a method of using an azo colorant, which has been prepared in a microreactor, as a colorant in an electrophotographic toner or developer, powder coating, ink jet ink or electronic medias, comprising incorporating said azo colorant into the electrophotographic toner or developer, powder coating, ink jet ink base or electronic medias.

The present invention further provides for an electrophotographic toner or developer, or a powder coating comprising a toner binder or a powder coating resin, and from 0.1 to 60% by weight, preferably 0.5 to 20% by weight, of an azo colorant prepared in a microreactor.

The present invention further provides for an ink jet ink comprising 0.5 to 15% by weight, preferably 1.5 to 8% by weight, (reckoned dry) of an azo colorant prepared in a microreactor.

The electrophotographic toners or developers, powder coatings, ink jet inks and electronic medias according to the present invention are distinguished from those containing conventionally prepared azo colorants by significantly higher color strength and transparency. Although the particle size and shape of said azo colorants differ from conventionally prepared azo colorants, the electrostatic properties, such as q/m values, of electrophotographic toners or developers containing said azo colorants are essentially alike. Therefore, surprisingly, transparency can simply be adjusted by blending an azo colorant prepared in a microreactor with an adequate amount of a conventionally prepared azo colorant of the same chemical structure, without influencing the electrostatic properties of the toner.

The azo pigments used in accordance with the invention may be combined with charge control agents providing either positive or negative control, in order to achieve a particular charging behavior. The use of positive and negative charge control agents simultaneously is a further option. The charge control agents and the pigment granules may be incorporated separately into the binder.

Examples of suitable charge control agents are:
triphenylmethanes; ammonium and immonium compounds; iminium compounds; fluorinated ammonium and fluorinated immonium compounds; biscationic acid amides; polymeric ammonium compounds; diallylammonium compounds.; aryl sulfide derivatives; phenol derivatives; phosphonium compounds and fluorinated phosphonium compounds; calix(n)arenes; resorcinols; cyclically linked oligosaccharides (cyclodextrins) and their derivatives, especially boron ester derivatives, interpolyelectrolyte complexes (IPECs); polyester salts; salt-like structured silicates, metal complex compounds, especially carboxylate-metal, salicylate-metal and salicylate-nonmetal complexes, aluminum azo complexes, α-hydroxycarboxylic acid-metal and -nonmetal complexes; boron complexes of 1,2-dihydroxyaromatics, 1,2-dihydroxyaliphatics or 2-hydroxy-1-carboxyaromatics; benzimidazolones; azines, thiazines or oxazines which are listed in the Colour Index as Pigments, Solvent Dyes, Basic Dyes or Acid Dyes.

Examples of charge control agents are e.g. described in US-2002-00 98 435-A1.

In a further embodiment, the present azo pigments can be combined with a wax during coupling, during finish, or afterwards as parts of a multi-component toner blend to provide electrophotographic toners or developers. A specific wax-coating of pigment particles is described in US-2002-00 98 435-A1.

For preparing a toner or developer, powder coating or ink jet ink, the azo colorant of the present invention can be employed as a dry powder, an aqueous or non-aqueous dispersion, or a presscake, e.g. a flush paste.

For shading the hue of the present color toner, it is possible to combine the azo colorant with an organic or inorganic pigment of different color (shade). It is also possible to combine the present color toner with another color toner of different color (shade).

EXAMPLES

Percentages are by weight in the examples, hereinbelow.

Example 1

C.I. Pigment Red 2

Preparation of a Diazonium Salt Solution:

A 500 ml three-neck flask is charged with 14.6 g of solid 2,5-dichloroaniline in 25.1 ml of water, and 30.8 ml of 31% hydrochloric acid are added. The mixture is stirred at RT for 8 hours to provide a hydrochloride solution. On addition of a further 25.1 ml of water and 3.75 ml of 60% acetic acid the reaction mixture is cooled to −5° C. At this temperature, 11.5 ml of 40% sodium nitrite solution are added dropwise to the reaction mixture over about 15 min and stirred in at 0° C. for a further 60 min. The reaction mixture is clarified by adding six spatula tipfuls of Celite and rapidly filtering with suction. The yellowish diazonium salt solution is made up with water to a total volume of 300 ml (~0.3 M).

Preparation of a Solution of the Coupling Component:

A second flask is charged with 23.9 g of Naphtol AS in 50.2 ml of water, and 26.7 ml of 25% aqueous sodium hydroxide solution are added. This mixture is then stirred at 60° C. for 120 min to dissolve it. It is rapidly filtered with suction and likewise made up with water to a total volume of 300 ml (~0.3 M).

Azo Coupling in Microreactor

The conventionally prepared diazonium salt and Naphtol solutions are pumped via calibrated piston pumps into the respective reactant inlets of the microreactor at a flow rate of 6 ml/min in each case. The actual azo coupling takes place in the reactor space. To obtain a buffering effect, these reactant solutions are diluted with an acetic acid solution (4 ml of 60% acetic acid and 600 ml of water) shortly upstream of the reactor inlets. The acetic acid solution is likewise fed at a flow rate of 6 ml/min into the reactant feed lines of the microreactor via a T-junction by means of calibrated piston pumps. The heat exchanger circuit of the microreactor is connected to a thermostat which ensures a reaction temperature of 40° C. At the reactor outlet the product suspension pH is about 3. The product suspension emerging from the reactor is collected in a flask, filtered off with suction and washed neutral with water. The moist C.I. Pigment Red 2 is dried at 65° C.

Example 2

Preparation of a Hydrochloride Solution of 2,5-dichloroaniline

A 500 ml three-neck flask is charged with 14.6 g of solid 2,5-dichloroaniline in 25.1 ml of water, 30.8 ml of 31% hydrochloric acid are added and the batch is stirred at room temperature for 8 hours. A further 25.1 ml of water and 3.75 ml of 60% acetic acid are added, and the solution is cooled to −5° C.

Solution of Naphtol AS

A flask is charged with 23.9 g of Naphtol AS in 50.2 ml of water, and 26.7 ml of 25% aqueous sodium hydroxide solution are added. This mixture is then stirred at 60° C. for 120 min to dissolve it. It is rapidly filtered with suction and likewise made up with water to a total volume of 300 ml (~0.3 M).

Dilute Sodium Nitrite Solution

A 1N aqueous sodium nitrite solution is prepared.

Buffer Solution

A buffer solution is prepared from 4 ml of 60% acetic acid and 600 ml of water.

Diazotization of 2,5-dichloroaniline in Microreactor

The 2,5-dichloroaniline hydrochloride solution prepared under a) is adjusted to 100 ml. The reactant solution and the 1N sodium nitrite solution from c) are pumped via calibrated piston pumps into the respective reactant inlets of the microreactor at a flow rate of 12 ml/min each. The diazotization reaction takes place in the reactor space. The heat exchanger circuit of the microreactor is connected to a thermostat which ensures the desired reaction temperature of about 5° C. The reaction solution emerging from the reactor is bulked with water to 300 ml in a collecting vessel and any excess sodium nitrite present is destroyed with sulfamic acid. The diazonium salt solution (~0.3 M) is used for azo coupling either in a downstream microreactor or in a reaction vessel according to conventional processes.

Azo coupling to form C.I. Pigment Red 2 in microreactor

The diazonium salt solution prepared by diazotization in a microreactor and also the Naphtol AS solution from b) are pumped via calibrated piston pumps into the respective reactant inlets of the microreactor at a flow rate of 6 ml/min each. The actual azo coupling takes place in the reactor space mentioned. To obtain a buffering effect, these reactant solutions are diluted with an acetic acid buffer prepared according to d), shortly upstream of the reactor inlets. The buffer solution is likewise fed with the aid of calibrated piston pumps into the reactant feed lines of the microreactor at a flow rate of 6 ml/min via a T-junction. The heat exchanger circuit of the microreactor is connected to a thermostat which ensures the desired reaction temperature of about 40° C. The product suspension pH at the reactor outlet is about 3. The product suspension emerging from the reactor is collected in a piston, filtered off with suction and washed neutral with water. The moist pigment is dried at 65° C.

Example 3

C.I. Pigment Yellow 191

Preparation of a Suspension of 2B-Acid Hydrochloride

A 500 ml three-neck flask is charged with 46.2 g of solid 2B-acid (95.6%) (5-amino-3-chloro-2-methylbenzenesulfonic acid) in 400 ml of water, and 18.1 ml of 33% aqueous sodium hydroxide solution are added. The mixture is then heated to 90° C. After addition of 1.6 g of Celite and further stirring at 90° C., the batch is filtered hot. 92.8 ml of 20% hydrochloric acid are added to the filtrate to precipitate the amine hydrochloride.

Conventional Diazotization

The 2B-acid hydrochloride suspension is diazotized with 26.6 ml of 40% sodium nitrite solution at 20° C. Initially the nitrite is metered in rapidly, while the rest is added at such a rate that there is always a small detectable nitrite excess. The ready-produced diazonium salt suspension is adjusted with water to a total volume of 1 500 ml (about 0.13 molar).

Diazotization of 2B-Acid in Microreactor

The 2B-acid hydrochloride suspension prepared according to a) is adjusted to 1 000 ml. The suspension and 40% of sodium nitrite solution are pumped via calibrated piston pumps into the respective reactant inlets of the microreactor at a flow rate of 40 ml/min and 1 ml/min respectively. The diazotization reaction takes place in the reactor space. The heat exchanger circuit of the microreactor is connected to a thermostat which ensures the desired reaction temperature of about 20° C. The reaction solution emerging from the reactor is stirred in a collection vessel for one hour in the presence of a small excess of nitrite. Water is added to a total volume of 1 500 ml, and any excess sodium nitrite present is destroyed with sulfamic acid. The diazonium salt solution (~0.13 M) is used for azo coupling either in a downstream microreactor or in a reaction vessel according to conventional processes.

Solution of Pyrazole Acid Three (3-(3-methyl-5-oxo-4,5-dihydropyrazol-1-yl)benzenesulfonic acid)

A flask is charged with 400 ml of water, and 57.7 g of pyrazole acid three are added. 22.2 ml of 33% aqueous sodium hydroxide solution are added to dissolve the acid. For coupling, the batch is adjusted with water to a total volume of 750 ml or 0.26 M and heated to 40° C.

Azo Coupling in Microreactor

The diazonium suspension prepared under b) or c) and the pyrazole acid three solution d) are pumped via calibrated piston pumps into the respective reactant inlets of the microreactor at a flow rate of 20 ml/min and 10 ml/min respectively. The actual azo coupling takes place in the reactor space mentioned. The reaction is then carried out at a reaction temperature of 40° C. and a pH of 6.3. The pigment suspension is subsequently stirred at 40° C. for 60 min. It is then heated to 80° C. and maintained at 80° C. for 15 min. A solution of 1.7 mol of $CaCl_2$, 61 mol of water, 0.0075 mol of sodium hydroxide and 0.01 mol of stearic acid is prepared per mole of pigment and added to the pigment suspension. The batch is stirred at 80° C. for 2 hours, then allowed to cool down to 70° C. and washed with water.

Laking to Form Pigment Yellow 191 in Microreactor

The pigment suspension is made up to 2 500 ml, heated to 80° C. and maintained at 80° C. for 15 min with stirring.

33.4 g of 77% calcium chloride are dissolved in 250 ml of water in a 400 ml beaker.

The pigment suspension and the calcium chloride solution are pumped via calibrated piston pumps into the respective reactant inlets of the microreactor at a flow rate of 90 ml/min and 9 ml/min respectively. The thermostat of the heat exchanger circuit of the microreactor is set to a reaction temperature of 85° C. The pigment suspension emerging from the reactor is collected in a stock reservoir vessel.

TABLE 1

Characterization of P.Y. 191 (conventional sample) and P.Y. 191 (microreactor sample):

| Parameter: | Conventional Sample | Microreactor Sample |
| --- | --- | --- |
| 1) Charging q/m: | in µC/g: | |
| 5 min | −16 | −15 |
| 10 min | −16 | −15 |
| 30 min | −16 | −15 |
| 2 h | −15 | −15 |
| 24 h | −11 | −12 |
| 2) pH | 6.3 | 7.4 |
| 3) Conductivity | 0.19 mS/cm | 0.33 mS/cm |
| 4) Degradation (DTA) | >360° C. | >360° C. |
| 5) Coloristic properties: | | |
| Transparency | Standard | 6 more transparent |
| Brightness | Standard | 5 brighter |
| Cleanliness of shade | Standard | 3 clearer |
| Color strength | 100% | 162% |
| Hue | Standard | 6 greener |

Example 4

C.I. Pigment Red 53:1

Preparation of a Suspension of CLT-Acid Hydrochloride (2-amino-5-chloro-4-methylbenzenesulfonic acid)

A 500 ml three-neck flask is charged with 44.6 g of solid CLT-acid (99%) in 250 ml of water, and 31 ml of 31% hydrochloric acid are added. The mixture is stirred for 30 min.

Conventional Diazotization

The CLT-acid hydrochloride suspension is diazotized with 26.6 ml of 40% sodium nitrite solution at 200C. Initially the nitrite is metered- in rapidly, the rest is added at such a rate that a small excess of nitrite is always detectable. The ready-prepared diazonium salt suspension is adjusted with water to a total volume of 1 500 ml (0.13 M).

Diazotization of CLT-Acid in Microreactor

The CLT-acid hydrochloride suspension prepared under a) is adjusted to 1 000 ml. The suspension and a 40% sodium nitrite solution are pumped via calibrated piston pumps into the respective reactant inlets of the microreactor at a flow rate of 40 ml/min and a flow rate of 1 ml/min respectively. The diazotization reaction takes place in the reactor space. The heat exchanger circuit of the microreactor is connected to a thermostat which shows the desired reaction temperature of about 15° C. The reaction solution emerging from the reactor is warmed to 20° C. with a small excess of nitrite. After a delay time of 60 min, it is made up with water to 1 500 ml and any excess sodium nitrite present is destroyed with sulfamic acid. The diazonium salt solution (~0.13 M) is used for azo coupling either in a downstream microreactor or in a reaction vessel according to conventional processes.

Solution of β-naphthol

A flask is charged with 400 ml of water, and 28.1 g of β-naphthol are added. 24.2 ml of 33% strength aqueous sodium hydroxide solution are added to dissolve the naphthol. For coupling, the batch is adjusted with water to a total volume of 750 ml or 0.26 M and heated to 40° C.

Azo Coupling in Microreactor

The diazonium suspension prepared under b) or c) and the β-naphthol solution d) are pumped via calibrated piston pumps into the respective reactant inlets of the microreactor at a flow rate of 20 ml/min and of 10 ml/min respectively. The actual azo coupling takes place in the reactor space mentioned. The reaction is carried out at a reaction temperature of 40 to 50° C. at a pH of 7.5. The pigment suspension is subsequently stirred at 40° C. and pH 7.5 for 30 min.

The pigment yield can be increased from 96% to 99% by the following variation: the pigment suspension is adjusted to pH 2.0 with 33% hydrochloric acid in a collecting vessel. After a delay time of about 10-15 min in the collecting vessel, the pigment suspension is pumped into a further microreactor. Sufficient 10% aqueous sodium hydroxide solution is pumped in through the second reactant inlet that, after mixing in the reactor, a pH of 7.5 is obtained at the outlet. The subsequent procedure is as described above, ie. stirring at 40° C. and pH 7.5 for 30 min.

Laking to form Pigment Red 53:1 in Microreactor

The pigment suspension is made up to 2 500 ml, heated to 80° C. and maintained at 80° C. for 15 min with stirring.

29 g of barium chloride×2 $H_2O$ are dissolved in 250 ml of water in a 400 ml beaker.

The pigment suspension and the barium chloride solution are pumped via calibrated piston pumps into the respective reactant inlets of the microreactor at a flow rate of 90 ml/min and 9 ml/min respectively. The thermostat of the heat exchanger circuit of the microreactor is set to a reaction temperature of 85-95° C. The pigment suspension emerging from the reactor is collected in a stock reservoir vessel.

Example 5

Water-soluble Reactive Dyes

Reactive Orange 107

Diazotization of Para Base Ester (Conventionally) 1.) Diazotization of Para Base Ester (2-(4-aminobenzenesulfonyl)ethyl sulfate)

25.5 g of 2-(4-aminobenzenesulfonyl)ethyl sulfate are introduced into 200 g of water with stirring in a 500 ml beaker. 36 g of 31% hydrochloric acid are added dropwise and stirred in for 30 min. The suspension is cooled down to 0 to −5° C. About 20 g of 5N sodium nitrite solution are added dropwise at that temperature over 30 min. The batch is subsequently stirred at about 5° C. for 1-2 hours. Excess nitrite is destroyed with sulfamic acid. The batch is made up with water to 300 ml (0.3 M).

Solution of 4-acetylamino-2-aminobenzenesulfonic Acid 21 g of 4-acetylamino-2-aminobenzenesulfonic acid are added to 250 g of water and adjusted to pH 4.3 with solid sodium bicarbonate. The solution is filtered with suction, made up to a volume of 300 ml with water (~0.3 M) and heated to 50° C.

Buffer Solution

A buffer solution is prepared from 75 g of acetic acid (100%) and 66 g of sodium acetate (anhydrous) in 800 g of water.

Azo Coupling in Microreactor

The diazonium component suspension prepared conventionally under a1) and the solution of 4-acetylamino-2-aminobenzenesulfonic acid a2) are pumped via calibrated piston pumps into the respective reactant inlets of the microreactor at a flow rate of 6 ml/min in each case. The actual azo coupling takes place in the reactor space mentioned. To obtain the pH of 4-4.5 required for the azo coupling, these reactant solutions are diluted with an acetic acid/sodium acetate buffer prepared according to a3), shortly upstream of the reactor inlets. The buffer solution is likewise fed into the reactant feed lines of the microreactor using calibrated piston pumps at a flow rate of 6 ml/min via a T-junction. The heat exchanger circuit of the microreactor is connected to a thermostat which shows the desired reaction temperature of 50° C. The product suspension pH is between 3.8-4.5 at the reactor outlet. The dye solution emerging from the reactor is collected in a flask, adjusted to a pH of 5.5-6.0 with sodium bicarbonate and clarified. The reactive azo dye is isolated by evaporating or spray drying.

The invention claimed is:

1. A method for preparing an ink comprising the step of incorporating into the ink an azo colorant prepared in a microreactor.

2. The method as claimed in claim 1, wherein the azo colorant is an azo pigment.

3. The method as claimed in claim 2, wherein the azo pigment is C.I. Pigment Yellow 1, 3, 12, 13, 14, 16, 17, 65, 73, 74, 75, 81, 83, 97, 111, 120, 126, 127, 151, 154, 155, 174, 175, 176, 180, 181, 183, 191, 194, 198; Pigment Orange 5, 34, 36, 38, 62, 72, 74; Pigment Red 2, 3, 4, 8, 12, 14, 22, 48:1-4, 49:1, 52:1-2, 53:1-3, 57:1, 60:1, 112, 137, 144, 146, 147, 170, 171, 175, 176, 184, 185, 187, 188, 208, 214, 242, 247, 253, 256, 266; Pigment Violet 32; or Pigment Brown 25.

4. A process for preparing an ink, comprising the steps of conducting one or more of a) diazotization of aromatic or hetaromatic amines or their ammonium salts, b) azo coupling, c) laking or d) metal complexing, in a microreactor to give an azo colorant, and incorporating the azo colorant into the ink.

5. The process as claimed in claim 4, wherein the azo colorant is an azo pigment.

6. The process as claimed in claim 4, wherein the diazotization, or the azo coupling, or the laking, or the diazotization and the azo coupling, or the diazotization and the azo coupling and the laking, are carried out in a microreactor.

7. The process as claimed in claim 4, wherein the diazotization and subsequent azo coupling are conducted using two or more microreactors connected in series or microreactors having two or more reaction zones.

8. The process as claimed in claim 4, wherein a solution or suspension of a coupleable diazonium salt and a solution or suspension of an azo coupling component are continuously introduced into the microreactor, continuously mixed with each other in the microreactor and reacted.

9. The process as claimed in claim 4, wherein a solution or suspension of aromatic or hetaromatic amine or its ammonium salt and a solution or suspension of a diazotizing agent are continuously introduced into the microreactor, continuously mixed with each other in the microreactor and reacted.

10. The process as claimed in claim 4, wherein a solution or suspension of an azo colorant that contains acid groups and a solution or suspension of a metal salt are continuously introduced into the microreactor, continuously mixed with each other in the microreactor and reacted.

* * * * *